US012700696B2

(12) United States Patent
Chen et al.

(10) Patent No.: US 12,700,696 B2
(45) Date of Patent: Aug. 4, 2026

(54) USB PLUG WITH SLIDING SLEEVE LOCKING MECHANISM AND REMOVABLE ELECTRONIC MODULE COMPRISING THE SAME

(71) Applicant: HEWLETT PACKARD ENTERPRISE DEVELOPMENT LP, Spring, TX (US)

(72) Inventors: Yuying Chen, Beijing (CN); Aijun Liu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 423 days.

(21) Appl. No.: 18/535,152

(22) Filed: Dec. 11, 2023

(65) Prior Publication Data

US 2025/0192475 A1 Jun. 12, 2025

(51) Int. Cl.
*H01R 43/26* (2006.01)
*H01R 13/627* (2006.01)
*H01R 24/60* (2011.01)

(52) U.S. Cl.
CPC ......... *H01R 13/6275* (2013.01); *H01R 43/26* (2013.01)

(58) Field of Classification Search
CPC ............ H01R 13/6275; H01R 13/6397; H01R 13/6582; H01R 24/60; H01R 43/26
See application file for complete search history.

(56) References Cited

U.S. PATENT DOCUMENTS

| | | | | |
|---|---|---|---|---|
| 7,275,941 | B1 * | 10/2007 | Bushby | H01R 13/6397 439/133 |
| 7,722,369 | B2 * | 5/2010 | Bushby | H01R 13/6397 439/135 |
| 8,529,283 | B1 * | 9/2013 | Carden | H01R 13/6581 439/352 |
| 9,734,358 | B2 * | 8/2017 | Soffer | G06F 21/44 |
| 11,527,851 | B2 * | 12/2022 | Nguyen | H01R 43/26 |
| 12,474,530 | B2 * | 11/2025 | Broughton | G02B 6/3831 |
| 12,525,741 | B2 * | 1/2026 | Chen | G06F 1/181 |
| 2022/0337002 | A1 * | 10/2022 | Nguyen | H01R 13/6273 |
| 2025/0038454 | A1 * | 1/2025 | Chen | G06F 1/181 |

FOREIGN PATENT DOCUMENTS

EP 2151765 A1 2/2010

* cited by examiner

*Primary Examiner* — Abdullah A Riyami
*Assistant Examiner* — Thang H Nguyen
(74) *Attorney, Agent, or Firm* — Jones Burke, PLLC

(57) ABSTRACT

A removable electronic module including electronic circuitry and a universal serial bus (USB) plug. The USB plug has an inner body and an outer sleeve movably coupled to the inner body. The outer sleeve is movable between a first position and a second position relative to the inner body. The inner body includes electrical contacts and one or more protrusions. The outer sleeve has one or more spring latch members configured to engage with a USB port in an installed state with a USB port. The protrusions are configured to, when the outer sleeve is in the first position, prevent removal of the USB plug from the USB port by preventing the spring latch members from disengaging from the USB port. When the outer sleeve is in the second position the spring latch members are free to disengage and the USB plug may be removed from the USB port.

20 Claims, 9 Drawing Sheets

310

310

1

USB PLUG WITH SLIDING SLEEVE LOCKING MECHANISM AND REMOVABLE ELECTRONIC MODULE COMPRISING THE SAME

INTRODUCTION

Some information processing devices (e.g., computers, networking devices, etc.), particularly legacy information processing devices, may lack certain functionalities, such as Wi-Fi transmission and/or reception capability, and a user may desire to add such functionalities to the device post-manufacture. One way to do this is to connect an auxiliary device to the information processing device, wherein the auxiliary device adds new functionalities and/or expands or supports existing functionalities of the information processing device. In particular, some auxiliary devices may be configured as removable electronic modules, which comprise electronic modules having a form factor that allows them to be easily portable and reversibly pluggable/unpluggable into the information processing device. Examples of auxiliary devices that may be configured as removable electronic modules include WiFi adapters, hardware accelerators, diagnostic devices, testing devices, or other portable auxiliary devices.

Electronic cables, auxiliary devices configured as removable modules, or other electronic devices may include a universal serial bus (USB) plug that is received by a USB port of an information processing device. Traditional USB plugs include arms configured to elastically bend and engage latch member of USB ports. The arms provide a weak biasing force and frictional engagement to hold the USB plug in the port while also allowing a USB plug to be easily inserted and removed from a USB port. However, the weak biasing force does not prevent unintentional disengagement of the USB plug from the USB port if sufficient force or vibration is applied. Additionally, over time and frequent use, the elasticity of the arms can degrade leading to a loose, and even less secure, engagement between the USB plug and the USB port. In addition to accidental disengagement, another concern with the loose attachment of USB plugs in USB ports is the theft or unauthorized removal of USB plugs and the devices of which they are a part (e.g., auxiliary devices configured as removable electronic modules). Therefore, some modern information processing devices are configured with means to secure, or lock, USB plugs and/or the devices comprising the same (e.g., an auxiliary device) and prevent unintentional disengagement and/or inhibit theft of the auxiliary device.

However, some information processing devices, particularly some legacy information processing devices, are not typically configured with means to secure, or lock, USB plugs or the devices comprising the same to prevent unintentional disengagement of the auxiliary device. Accordingly, such devices are more likely to experience unintentional disengagement of USB plugs or device comprising the same, e.g., an auxiliary device, (e.g., a technician bumping into the auxiliary device, vibrations originating from the auxiliary device, etc.). Moreover, such devices are more prone to theft or unauthorized removal of USB plugs and the device comprising the same. Although aftermarket third party devices for securing a USB plug to a USB port exist, these third party devices tend to have multiple parts that can be easily lost and/or are large resulting in adjacent ports on the information processing device being blocked. Third party securing and/or locking devices also have an associated cost per unit and can be prohibitively expensive when considering the number of units required, time required to install, and associated installation costs.

BRIEF DESCRIPTION OF THE DRAWINGS

The present disclosure can be understood from the following detailed description, either alone or together with the accompanying drawings. The drawings and related description of the figures are included to provide a further understanding of the present disclosure and are incorporated in and constitute a part of this specification. The drawings illustrate one or more nonlimiting aspects and implementations of the present teachings and together with the description explain certain principles and operation. In the drawings.

DETAILED DESCRIPTION

Figure 1:
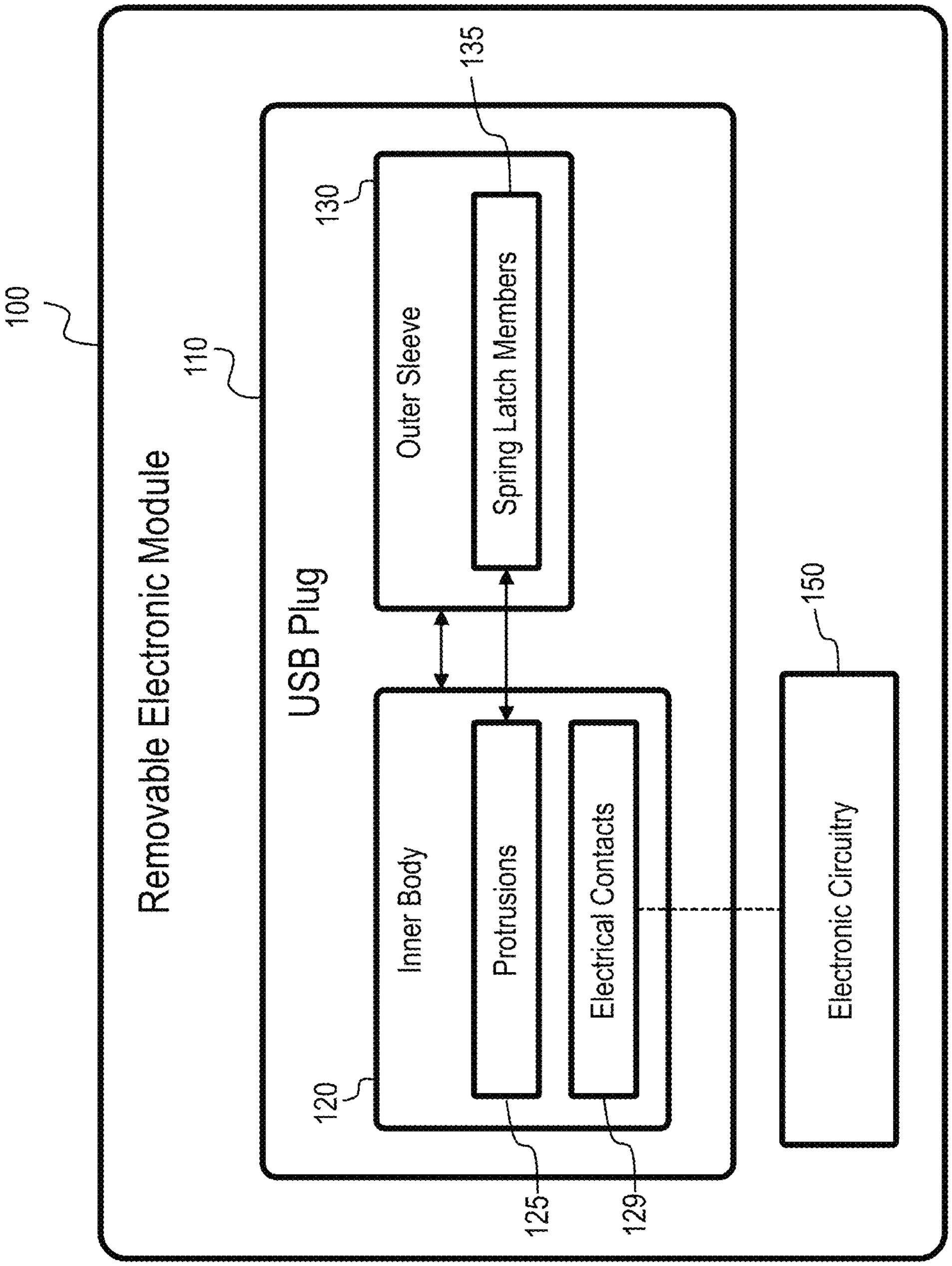
FIG. 1 is a block diagram illustrating a USB plug with a sliding sleeve locking mechanism and a removable electronic module comprising the same.

As noted above, most USB plugs and ports include features to provide some level of retention while also allowing quick and easy engagement and disengagement from one another. These features may include arms of a USB plug and latch members of a USB port. The arms elastically bend to flex around the latch members coupled to the USB port. When the arms are fully engaged with the latch members a weak biasing forced is exerted by the arms on the latch members which maintains a weak frictional engagement to retain the USB plug in the USB port. When the USB plug is intentionally removed from the USB port, the arms will again elastically bend/flex around the latch member to release the associated auxiliary device. Little more than minimal force is required when engaging or disengaging a traditional USB plug to/from a traditional USB port.

Although exerting minimal force to engage or disengage a traditional USB plug and a traditional USB port is convenient with respect to ease of use, the same features also create challenges. For example, it is not uncommon for an auxiliary device connected to an information processing device to unintentionally disengage from the information processing device. Whether the disengagement is partial or total, if communication between the information processing device and the auxiliary device is interrupted then the benefit and purpose of the auxiliary device is frustrated. Accordingly, unintentional disengagement is more than a mere inconvenience. For example, if an auxiliary device that enables Wi-Fi capability becomes disengaged and separates from a legacy information processing device after unintentional contact with a technician, the legacy information processing device will lose wireless communication capability which could lead to the loss of data or an interruption of services. Moreover, the plethora of situations that could result in an unintentional disengagement makes the issue challenging to address while still ensuring easy and convenient engagement and disengagement of an auxiliary device from an information processing device. For example, external vibration, vibration originating directly from the information processing device, direct or indirect contact with an object or individual, normal wear and tear, and even damage to the arms of the USB plug or to the latch members of the USB port could each result in a disengagement event, individually or in combination.

Some modern information processing devices have integrated features to secure auxiliary devices or to receive an ancillary securing device to secure auxiliary devices. However, these features increase overall cost and may only work with specific models of information processing devices. Moreover, many of the modern integrated features and ancillary securing devices are not backwards compatible with respect to legacy information processing devices. Modifying a legacy information processing device to secure a removably attached auxiliary device can be time consuming and expensive, if not impractical. As such, legacy information processing devices typically lack the means to secure or lock removably attached auxiliary devices connected via universal serial bus (USB) plugs and USB ports. Accordingly, it is a challenge to secure an auxiliary device engaged to a legacy information processing device or modern information processing devices which lack features to secure the same in a manner which prevents unintentional disengagement of the auxiliary device.

To address these and other issues, examples disclosed herein provide USB plugs (and devices comprising the same) having a sliding sleeve locking mechanism that allows the USB plug to self-secure to a USB port to prevent unintentional or unauthorized disengagement therefrom. In particular, the USB plugs comprise an inner body and a sliding sleeve that can be moved relative to the inner body. In a first position of the sliding sleeve, the spring latch members are prevented from elastically bending. Thus, if the spring latch members are engaged with latch engagement members of a USB port and the sliding sleeve is moved to the first position, the spring latch members are prevented from disengaging from the latch engagement members of the USB port because they are prevented from bending. In this manner, the USB plug can be secured to the USB port and unintentional disengagement is avoided. In addition, in some examples, the sliding sleeve may be locked in the first position, which can reduce the likelihood of unauthorized removal. Notably, no additional modification of the USB port or the information processing device is required, nor are additional component parts required to secure the removable electronic module to the information processing device, whether modern or legacy. In some examples, the USB plugs may be provided as part of a removable electronic module, such as an auxiliary device configured as a removable electronic module. Moreover, in some examples, the USB plugs and removable electronic modules comprising the same can be manufactured utilizing cost-effective manufacturing techniques. In some examples, USB has an inner body comprising electrical contacts and one or more protrusions. The USB plug also has an outer sleeve comprising one or more spring latch members configured to releasably engage with latch engagement members of a USB port when installed therewith in an installed stated. The outer sleeve is movably coupled to and at least partially surrounds the inner body. The outer sleeve is movable between a first position and a second position with respect to the inner body.

In the first position, the one or more projections of the inner body are positioned to block the spring latch members of the outer sleeve from elastically bending. When the one or more projections block the spring latch members, the example removable electronic module cannot be installed into a USB port or removed from a USB port if previously installed.

In the second position, the one or more projections of the inner body do not block the spring latch members of the outer sleeve. Therefore, the spring latch members are unobstructed and free to elastically bend to releasably engage with or disengage from latch engagement members of a USB port of an information processing device.

To enter the installed state, the outer sleeve is moved to the second position and the USB plug is inserted into a USB port of an information processing device. During insertion, the spring latch members of the outer sleeve elastically bend and flex around latch engagement members of the USB port. Once engaged, the spring latch members exert a weak biasing force against the latch engagement members. The weak biasing force and associated frictional engagement between the spring latch members and the latch engagement members releasably couples the example removable electronic module and the information processing device in the installed state.

Once installed, the USB plug (and removable electronic module comprising the same, if applicable) may enter a retained stated to prevent disengagement or removal from the information processing device. To enter the retained state, the outer sleeve is moved to the first position. When the outer sleeve is moved to the first position, the one or more projections of the inner body move towards, but not completely to, the distal end of the spring latch members. In the retained state, the one or more projections obstruct and prevent the spring latch members from elastically bending. When obstructed by the one or more projections, the spring latch members cannot elastically bend around or disengage from the latch engagement members of the USB port of the information processing device. Thus, the USB plug (and removable electronic module comprising the same, if applicable) is prevented from disengaging and cannot be removed from the information processing device.

Still referring to the retained state, when the outer sleeve is moved from the first position to the second position, the one or more protrusions move towards a proximal end of the one or more spring latch members connecting to the inner body. In the second position, the one or more protrusions no longer block the one or more spring latch members from elastically bending and the example removable electronic module is returned to the installed state. Although the one or more spring latch members remain engaged with the latch engagement members when the outer sleeve is in the second position, the spring latch members are free to elastically bend around and disengage from the latch engagement members of the USB port. Thus, the USB plug (and removable electronic module comprising the same) is free to be uninstalled/removed from the information processing device and enter an uninstalled stated.

With respect to the uninstalled state, if the outer sleeve is in the first position the example removable electronic module cannot be installed into a USB port of an information processing device. As described above, when the outer sleeve is in the first position, the one or more spring latch members are prevented from elastically bending. Blocking the one or more spring latch members from elastically bending prevents disengagement of the example removable electronic module when in the retained state just as the same will prevent engagement of the example removable electronic module with an information processing device in the uninstalled state.

Notably, the force necessary to remove a traditional USB plug from a traditional USB port is not sufficient to disengage the removable electronic module from a USB port of an information processing device when the USB plug is in the retained state. In the retained stated, the USB plug self-retains, or self-locks, to prevent disengagement and/or removal from a USB port of an information processing device. In some examples, the retained state prevents unintentional disengagement and accidental removal. In some examples, the retained state prevents unauthorized forced disengagement, e.g., theft. In some examples, the USB plug may include additional features to lock the removable electronic module in the retained state (for example, by locking the sleeve in the first position). However, when the outer sleeve is in the second position, the example USB plug requires only minimal force to engage with or disengage from a USB port of an information processing device to ensure convenience and ease of use.

The self-contained, self-retaining property of the example USB plug and removable electronic modules comprising the same as disclosed herein eliminates the need for expensive and time-consuming modification of information processing devices, legacy or modern, to securely retain auxiliary devices to prevent unintentional disengagement. The example USB plug and removable electronic modules disclosed herein also alleviate the need to replace legacy information processing devices with modern information processing devices. The self-contained and self-retaining properties of the example USB plugs and removable electronic modules disclosed herein also simplifies transport and installation because there is no need to track a plurality of loose parts which might otherwise become misplaced or lost. Importantly, the example USB plugs and removable electronic modules disclosed herein work with standard USB ports without requiring modification thereof, and thus are universally compatible with any information processing device that includes a standard USB port. Thus, the need for a plurality of unique modifications each specific to different models of information processing devices is also eliminated.

In some examples, the removable electronic modules disclosed herein may be included in one or more systems. One example of a system includes an example implementation of the removable electronic module disclosed herein and one or more locking features, e.g., a lock, to prevent movement of the outer locking sleeve.

Turning now to the figures, various devices, systems, and methods in accordance with nonlimiting aspects of the present disclosure will be described. In the following description, directional/relational terms such as bottom, top, front, back, above, below, and the like are used to aid understanding, but these terms are used only in relation to the orientations and arrangements depicted in the figures and are not intended to imply anything about the locations or orientations of the parts in other contexts, such as relative to an external reference frame. In particular, USB plugs and removable electronic modules disclosed herein may be oriented in different orientations from the illustrated orientations, and the usage herein of directional or relationship terms relative to the illustrated orientations should not be misunderstood as limiting the orientations of the USB plugs or the removable electronic modules. Thus, for example, a removable electronic module described herein as having a bottom surface and a top surface (with the top surface being positioned above the bottom surface in the illustrated orientation) may be positioned in a manner that is rotated relative to the illustrated orientation such that the top surface is no longer located above the bottom surface in the new orientation.

FIG. 1 is a block diagram conceptually illustrating an example USB plug and a removable electronic module comprising the same. It should be understood that FIG. 1 is not intended to illustrate specific shapes, dimensions, or other structural details accurately or to scale, and that implementations of the USB plug and removable electronic module may have different arrangements of the illustrated components and may also include other parts that are not illustrated. The USB plug is illustrated in FIG. 1 and described below in the context of being part of the removable electronic module, but the USB plug may be provided separately from the removable electronic module and/or may be used in some other apparatus or device, such as a USB cable or some other electronic device.

As shown in FIG. 1, the removable electronic module 100 comprises a USB plug 110 and electronic circuitry 150. It is contemplated that the USB plug 110 may comprise a Type-A plug, and that the USB plug 110 may also comprise a standard, a mini, or a micro format. Accordingly, the proportions and arrangements of the USB plug 110 relative to the first electrical contacts 129 is not limited to one specific type of USB plug.

The USB plug 110 includes an inner body 120 comprising one or more protrusions 125 and first electrical contacts 129 electrically connected with the electronic circuitry 150. The first electrical contacts 129 are configured to removably engage with complementary electrical contacts in a USB port in an installed state of the USB plug 110 in the USB port, e.g., a USB port of an information processing device.

The USB plug 110 also includes an outer sleeve 130 movably coupled to and at least partially surrounding the inner body 120. The outer sleeve 130 comprises one or more spring latch members 135 configured to engage with latch engagement members of a USB port when in the installed state of the USB plug 110 releasably engaged in a USB port. In some examples, the spring latch members 135 may be similar to spring latch members used in standard USB plugs, and may be configured to engage with the type of latch engagement members used in standard USB ports. The outer sleeve 130 of the USB plug 110 is movable between a first position and a second position relative to the inner body, which transitions the USB plug between various states described below.

In the first position, the one or more protrusions 125 of the inner body 120 prevent the one or more spring latch members 135 of the outer sleeve 130 from elastically bending. If this is done while the USB plug 100 is in the installed state in the USB port, the prevention of one or more spring latch members 130 from elastically bending will prevent the one or more spring latch members 130 from disengaging from latch engagement members of a USB port, resulting in a retained state. In the retained state, the USB plug 110 is retained by the USB port and is prevented from disengaging or being removed from the USB port as long as the outer sleeve 130 is in the first position. It is contemplated that the specific size, shape, number, and arrangement of the one or more protrusions 125 will correlate with the specific size, shape, number, and arrangement of the one or more spring latch members 135. Note that the retained state is a special case of the installed state. However, not all installed states are retained states, and the plug may also comprise an installed but unretained state, described below.

In the second position, the one or more protrusions 125 do not interfere with the one or more spring latch members 135 elastically bending. Thus, if the outer sleeve 130 is moved to the second position while the USB plug is in USB port, the enabling of the one or more spring latch members 135 to elastically bend allows them to disengage from latch engagement members of the USB port. In other words, if the USB plug is in the retained state, then moving the sleeve 130 to the second position exits the retained state and enters an installed-but-unretained state. Thereafter, if so desired, the USB plug 110 can be removed from the USB port by applying forces which cause disengaging of the one or more spring latch members 135 from latch engagement members of a USB port. The removal of the USB plug 110 from the USB port results in an uninstalled state.

In some examples, the removable electronic module 100 is configured to transition from the uninstalled state to a retained stated by the following sequence (engagement with just one spring latch member 135 and one latch engagement member is described to aid understanding, but if multiple spring latch members 135 and respective latch engagement members are present, the engagement with those may proceed in a similar fashion).

The removable electronic module 100, in the uninstalled state, is moved into a position adjacent a USB port of an information processing device. The USB plug 110 is oriented to face and align with the USB port. The outer sleeve 130 of the USB plug 110 is moved to the second position. The USB plug 110 is inserted into the USB port causing a spring latch member 135 to engage with a corresponding latch engagement member, resulting in the installed state (specifically, the installed-but-unretained state). To transition into the retained state, the outer sleeve 130 is moved into the first position and the spring latch member 135 is prevented from elastically bending relative to the outer sleeve 130 due to one or more protrusions 125 of the inner body 120. Once the outer sleeve 130 is in the second position, the USB plug 110 is prevented from disengaging the USB port. In some implementations, a lock (not shown) is provided and engaged with the both the outer sleeve 130 and the inner body 120 to prevent movement with respect to one another thereby locking the outer sleeve 130 in the first position. In these implementations the outer sleeve 130 cannot be moved to the second position without unlocking the outer sleeve 130 and the inner body 120 with respect to one another and removing the lock.

To transition from the retained state to the installed-but-unretained state, the outer sleeve 130 is moved to the second position. Once the outer sleeve 130 is in the second position, the spring latch member 135 may elastically bend with respect to the outer sleeve 130 to disengage from a latch engagement member if so desired. The USB plug 110 and the USB port are now releasably engaged and the USB plug 110 may be removed from the USB port to return to the uninstalled state.

In some implementations, in addition to the outer sleeve 130 being movable to the first position when the USB plug 110 is in the installed state, the outer sleeve 130 can also be moved to the first position while the USB plug 110 is in the uninstalled state. The outer sleeve 130 may then be locked in the first position with respect to the inner body 120 using a lock. If the USB plug is locked in the first position, the USB plug 110 cannot be installed in a USB port because the spring latch member 135 is prevented from elastically deforming to engage a latch engagement member of the USB port. Thus, the outer sleeve 130 cannot be moved to the second position without removing the lock to allow relative movement between the outer sleeve 130 and the inner body 120.

As noted above, in some implementations the USB port 100 may be provided as part of removable electronic module 100, which comprises electronic circuitry 150. The electronic circuitry may comprise, for example, a printed circuit assembly with information processing components, such as a microcontroller, system-on-chip (SoC), application-specific integrated circuitry (ASIC), processor, etc. For example, if the removable electronic module 100 is a WiFi adapter, the electronic circuitry may include a WiFi PHY chip and/or other WiFi transceiver circuitry.

Figure 2:
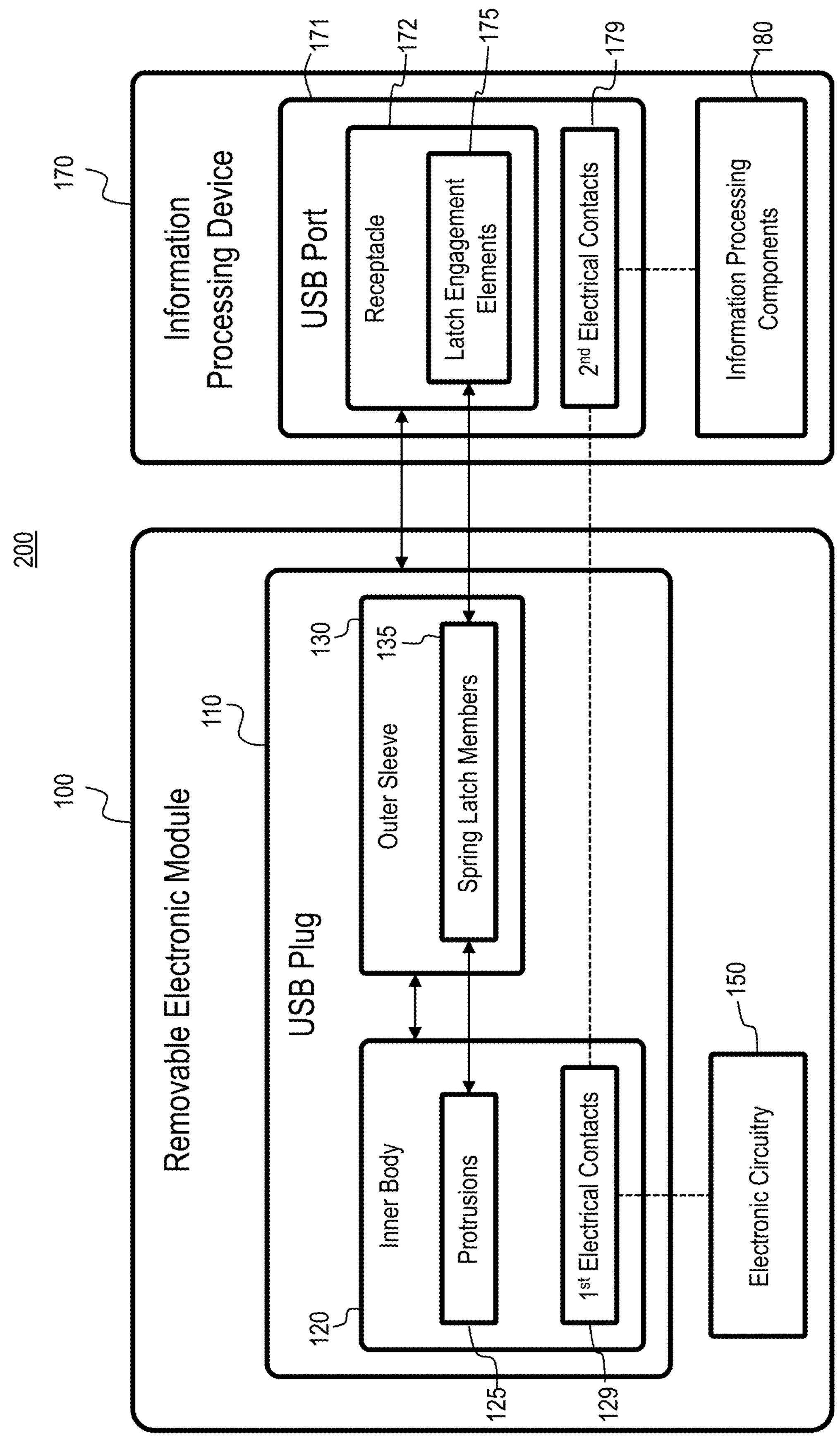
FIG. 2 is a block diagram illustrating system including an information processing device and the removable electronic module of FIG. 1.

FIG. 2 is a block diagram conceptually illustrating a system 200 including the removable electronic module 110 of FIG. 1. It should be understood that FIG. 2 is not intended to illustrate specific shapes, dimensions, or other structural details accurately or to scale, and that implementations of the system including the removable electronic module may have different arrangements of the illustrated components and may also include other parts that are not illustrated.

As shown in FIG. 2, the system 200 comprises the removable electronic module 110 and an information processing device 170. The descriptions of components of the removable electronic module 100 and USB plug 110 with respect to FIG. 1 are applicable and thus duplicative description of various aspects already described above may be omitted below.

In some examples, the information processing device 170 comprises a computer (e.g., server), a networking device (e.g., network switch, router, access point, etc.), or any other electronic device which sends, receives, retrieves, stores, routes, manipulates, or otherwise processes digital information. The information processing device 170 comprises a USB port 171 and information processing components 180. The information processing components 180 may comprise a processor, an SoC, an ASIC, a microcontroller, or any other electronic component configured to send, receive, retrieve, store, route, manipulate, or otherwise processes digital information. It is contemplated that the USB port 171 may comprise a Type-A port and that the USB port 171 may also comprise a standard, a mini, or a micro format. The USB port 171 includes second electrical contacts 179 and a receptacle 172 having one or more latch engagement members 175 to engage the spring latch members 135. The second electrical contacts 179 are electrically connected to the information processing components 180. The second electrical contacts 179 are configured to electrically connect with, and are complementary to, the first electrical contacts 129 of the USB plug 110 when in an installed state. The receptacle 172 is configured to receive the outer sleeve 130 of the USB plug 110 and the one or more latch engagement members 175 are configured to engage with the one or more spring latch members 135 of the USB plug 110 when in the installed state to releasably engage the USB plug 110 with the USB port 171.

As described above in reference to FIG. 1, the outer sleeve 130 of the USB plug 110 is movable between a first position and a second position relative to the inner body 120. In the installed state, the one or more spring latch members 135 are engaged with the one or more latch engagement members 175. When the outer sleeve 130 is moved to the first position, the one or more protrusions 125 of the inner body 120 prevent from the one or more spring latch members 135 from elastically bending. Preventing the one or more spring latch members 135 from elastically bending prevents disengagement from the one or more latch engagement members 175. Thus, the USB plug 110 and the USB port 171 enter into a retained state where the USB plug 110 is securely retained in the USB port 171 and prevented from disengaging or being removed therefrom. When the outer sleeve 130 is moved to the second position, the one or more protrusions 125 of the inner body 120 no longer interfere with the one or more spring latch members 135 from elastically bending. Allowing the one or more spring latch members 135 to elastically bend allows disengagement from the one or more latch engagement members 175. Therefore, when the outer sleeve 130 is in the second position the USB plug 110 is releasably engaged in the USB port 171 and can be removed if so desired.

The removable electronic module 100 may comprise a plurality of materials. In some example implementations, the inner body 120 may comprise a plastic that is rigid and resilient, including, but not limited to high-density polyethylene, polycarbonate, polyamide-imide, high impact polystyrene, and acrylonitrile butadiene styrene. In some example implementations, the outer sleeve 130 comprises sheet metal. The sheet metal may comprise metal, including, but not limited to steel, aluminum, titanium, and alloys including the same. In some implementations, the sheet metal has a thickness from about 0.3 millimeters to about 0.5 millimeters. It is contemplated that components of the removable electronic module 100 are not limited to any single material and may include a combination of materials discussed above.

Turning now to FIGS. 3-12, an example of a USB plug 310 is described. In FIGS. 3, 4, and 9-12, the USB plug 310 is shown along with a USB port 371 to provide context, but it should be understood that the USB port 371 is separate from the USB plug 310. The USB port 371 (not required) may be part of an information processing device (not required). The USB plug 310 is one example configuration of the removable electronic module 100 of FIG. 1 described above. Accordingly, some components of the USB plug 310 are similar to (e.g., specific configurations of) components of the plug 110 described above. Similar components are referred to using the same last two digits, such as 120 and 320. The descriptions of components of the USB plug 110 are applicable to the similar components of the USB plug 310, and thus duplicative description of various aspects already described above may be omitted below. Although the USB plug 310 is one configuration of the USB plug 110, the USB plug 110 and the components thereof are not limited to the USB plug 310 and the components thereof.

Figure 3:
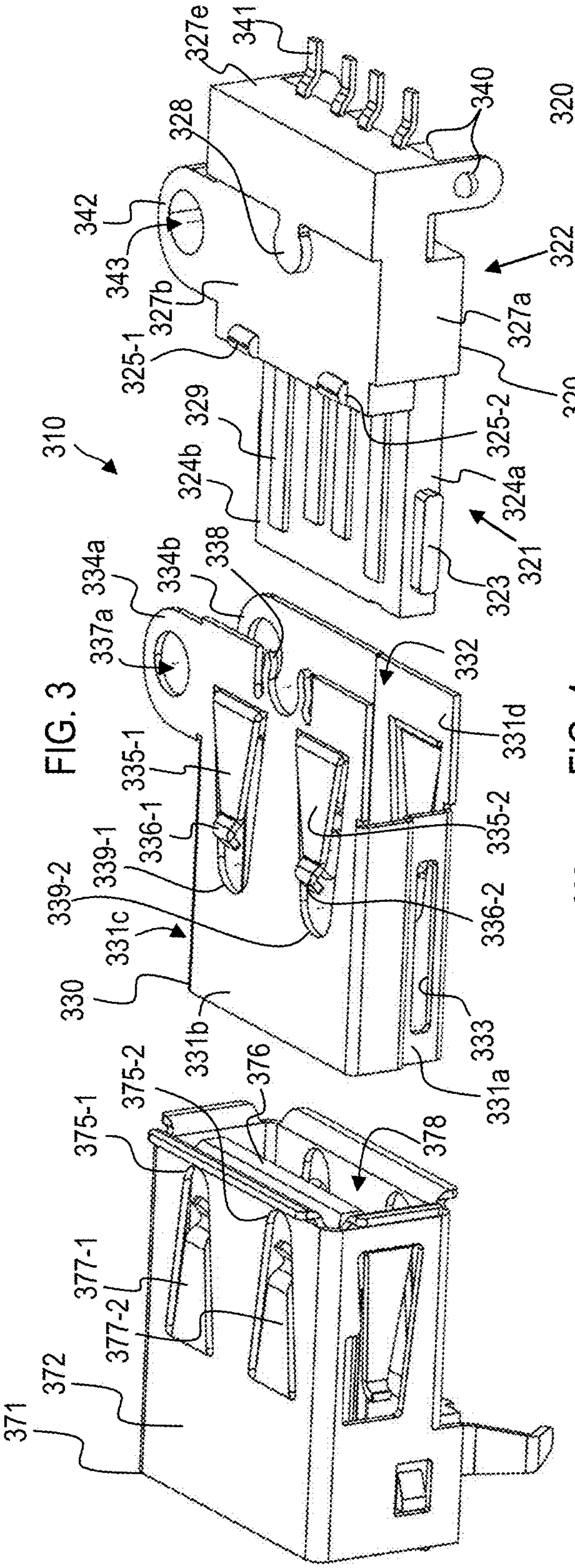
FIG. 3 is an exploded view, from a top perspective, of an example USB plug with a sliding sleeve locking mechanism and corresponding USB port.
Figure 4:
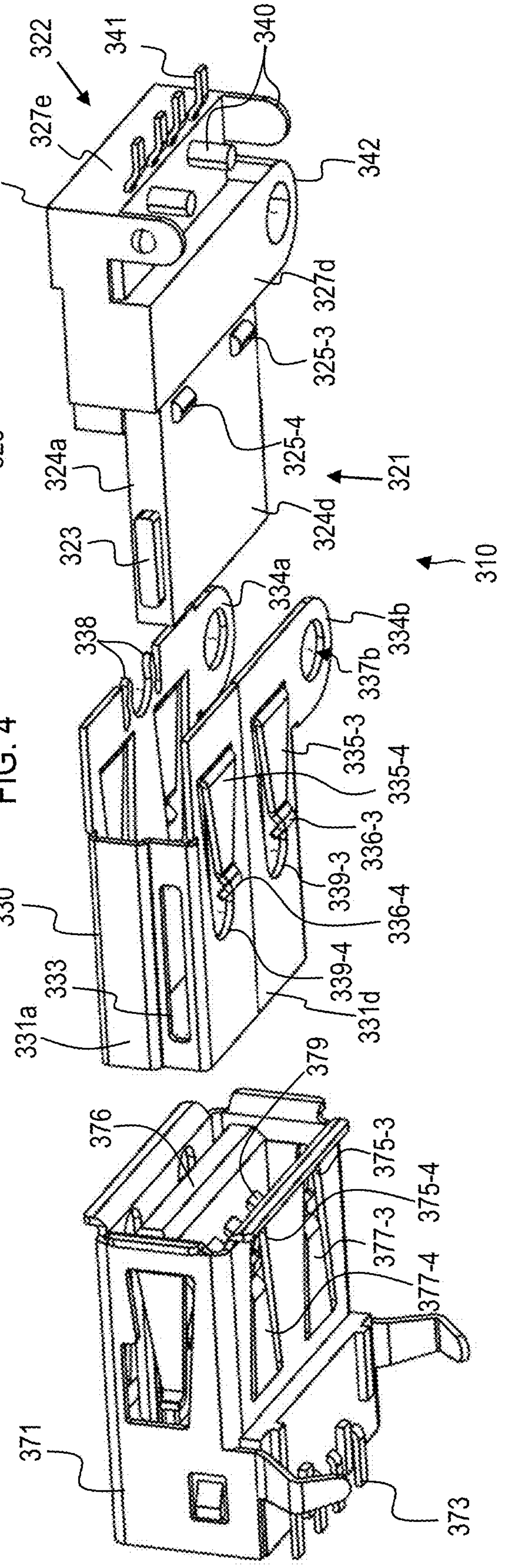
FIG. 4 is an exploded view, from a bottom perspective, of the example USB plug and USB port of FIG. 3.

For the sake of clarity, to provide context with respect to the members of the USB plug 310, an example USB port 371 (not required) is first described. The USB port 371 may be a standard USB port, and as-illustrated is a standard Type-A USB port. As illustrated in FIGS. 3-4, the USB port 371 includes receptacle 372 having a top port wall, a bottom port wall spaced from and opposite the top port wall, a left port wall extending between the top port wall and the bottom port wall, and a right port wall extending between the top port wall and the bottom port wall opposite and spaced from the left port wall. The top port wall, the bottom port wall, the left port wall, and the right port wall together define a port interior space 378 to receive a portion of the USB plug 310. The USB port 371 also includes second electrical terminations 373 and a contact holding portion 376 disposed in the port interior space 378. The contact holding portion 376 includes second electrical contacts 379 disposed thereon. The second electrical terminations 373 are configured to electrically connect the second electrical contacts 379 with information processing components of an information processing device.

The example USB port 371 further comprises a plurality of spring latch members 377, namely spring latch members 377-1, 377-2, 377-3, 377-4 configured to engage with latch engagement members 339 of the USB plug 310 as will be described in greater detail below. The top port wall includes a first spring latch member 377-1 and a second spring latch members 377-2 as depicted in FIG. 3. The bottom port wall includes a third spring latch members 377-3 and a fourth spring latch members 377-4 as depicted in FIG. 4. The spring latch members 377 are disposed in latch apertures formed in the walls of the receptacle 372. Each spring latch member 377 is has a raised engagement portion which engages with the USB plug 310.

The USB port 371 also comprises a plurality of latch engagement members 375, namely latch engagement members 375-1, 375-2, 375-3, and 375-4. The first latch engagement member 375-1 comprises a first latch lip which defines a rim of one of the latch apertures in the receptacle 372. The first latch engagement member 375-1 is configured to engage with an engagement portion 336-1 of spring latch member 335-1, as will be described in greater detail below. Similar components are referred to using the same number followed by a different hyphenated number, such as 377-1 and 377-2. The descriptions of components of the first spring latch member 377-1 are applicable to the similar components of the second, third, and fourth spring latch members 377-2, 377-3, 377-4, and thus duplicative description of various aspects already described above may be omitted below.

Returning now to USB plug 310, the example implementation illustrated in FIGS. 3-12 will now be described. The USB plug 310 which includes an inner body 320 and an outer sleeve 330 movably coupled to and at least partially surrounding the inner body 320. The inner body 320 comprises first electrical contacts 329 and a plurality of protrusions 325-1, 325-2, 325-3, 325-4 extending from the inner body 320. The outer sleeve 330 comprises a plurality of spring latch members 335-1, 335-2, 335-3, 335-4 configured to releasably engage the latch engagement members 375-1, 375-2, 375-3, 375-4 of the example USB port 371, when in the installed state.

In the example implementation depicted in FIGS. 3-12, the inner body 320 includes a first body portion 321 and a second body portion 322. The first body portion 321 comprises a plurality of surfaces defined relative to the illustrated example implementation of the USB plug 310. The plurality of surfaces includes a first left surface 324*a*, a first top surface 324*b*, a first right surface (not shown), and a first bottom surface 324*d*. The first left surface 324*a* and the first right surface are opposite and spaced from one another as are the first top surface 324*b* and the first bottom surface 324*d*. The first electrical contacts 329 are disposed on the first top surface 324*b* of first body portion 321 and are configured to electrically connect with the second electrical contacts 379 of the example USB port 371, when the USB plug 310 is in an installed state.

The first body portion 321 of the example implementation includes a plurality of guiding features to constrain movement of the outer sleeve 330 relative to the inner body 320. The guiding features also assist in coupling the outer sleeve 330 to the inner body 320 to prevent separation of the outer sleeve 330 from the inner body 320. As illustrated in FIGS. 3 and 4, a first guiding feature comprising a tab 323 extending from the first left surface 324*a*. A second guiding feature (not shown) comprising a second tab (not shown) extends from the first right surface (not shown) opposite the first guiding feature. The first and second guiding features will be described in greater detail below with reference to the outer sleeve 330.

The second body portion 322 comprises a plurality of surfaces defined relative to the illustrated example implementation of the removable electronic module. The plurality of surfaces include a second left surface 327*a*, a second top surface 327*b*, a second right surface (not shown), and a second bottom surface 327*d*. The second left surface 327*a* and the second right surface are opposite and spaced from one another as are the second top surface 327*b* and second bottom surface 327*d*.

Figure 5:
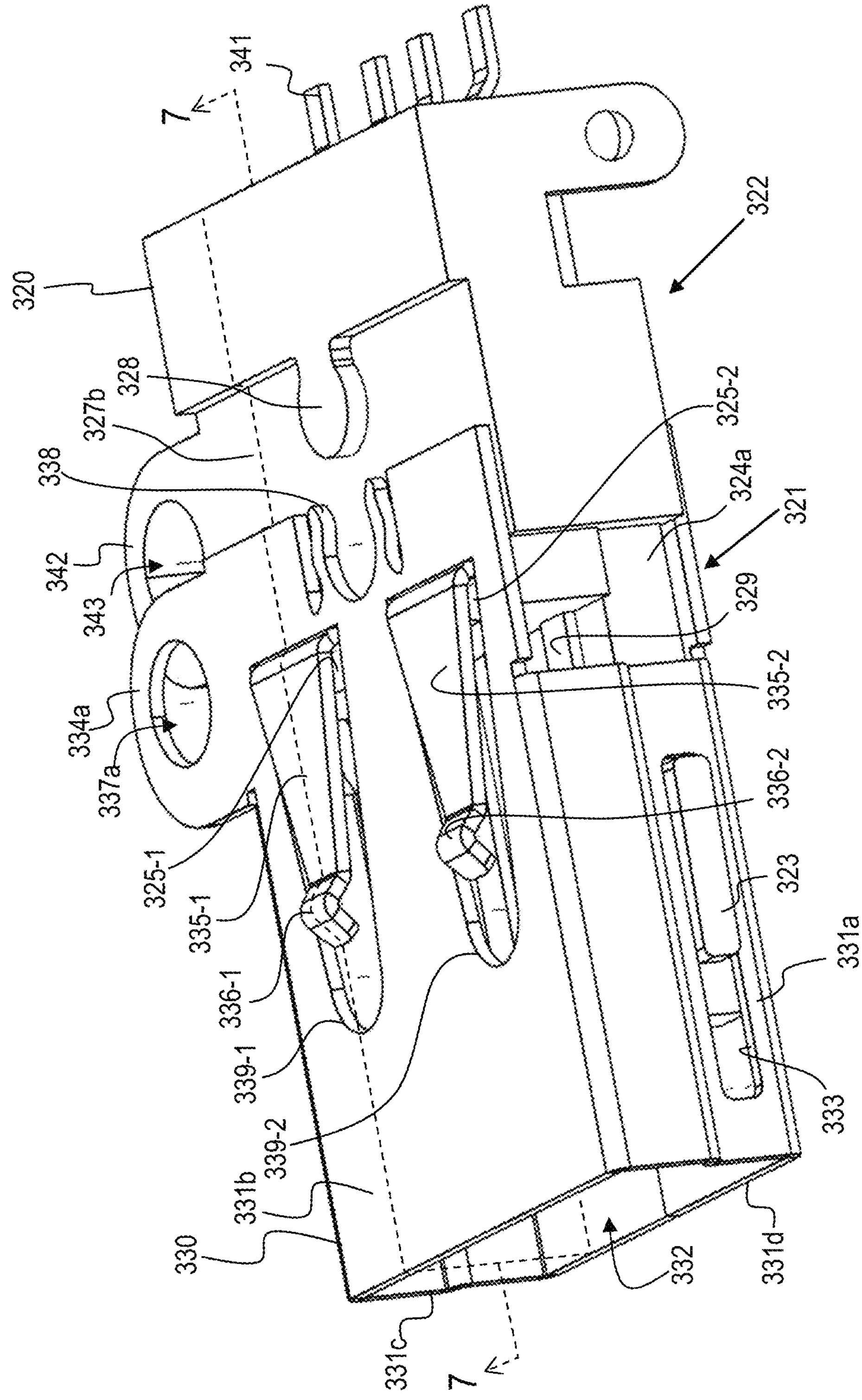
FIG. 5 is a top perspective view of the example USB plug of FIG. 3, wherein an outer sleeve is in a second position.
Figure 6:
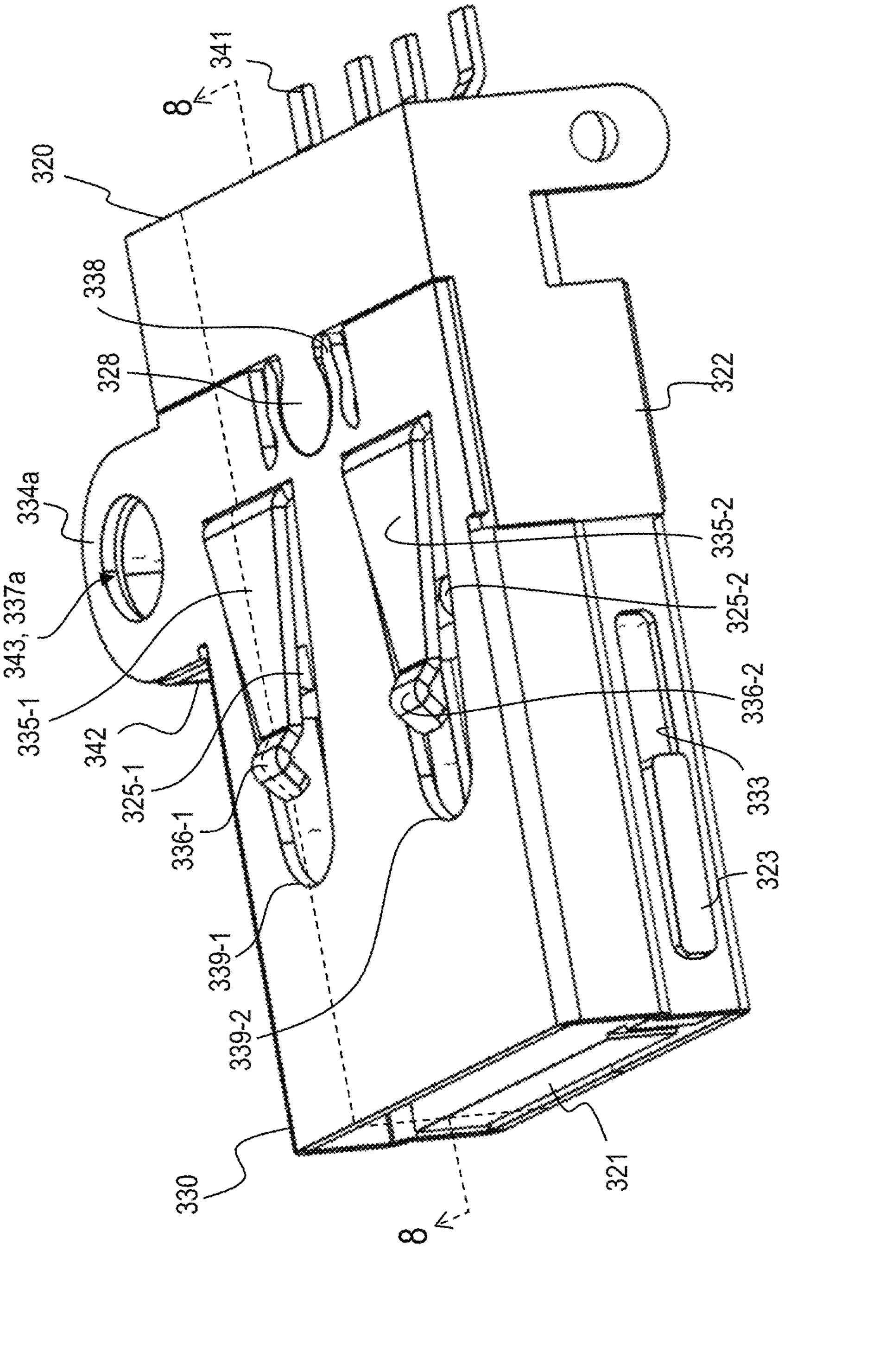
FIG. 6 is a top perspective view of the example USB plug of FIG. 3, wherein the outer sleeve is in a first position.
Figure 7:
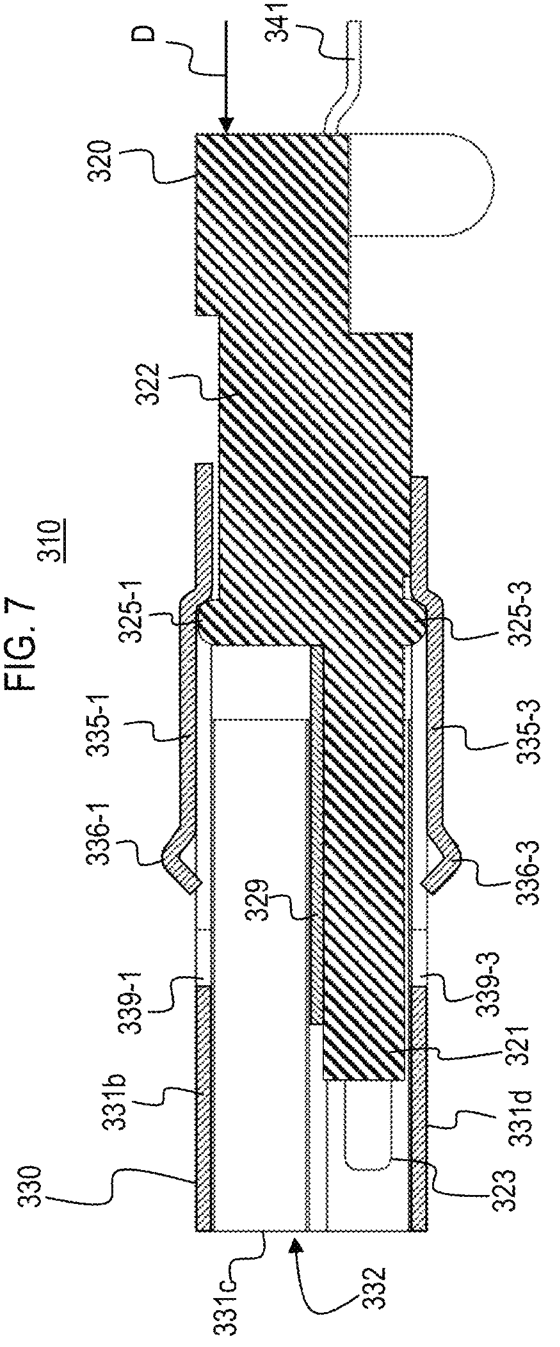
FIG. 7 is a cross sectional view of the example USB plug of FIG. 5 with the outer sleeve in the second position, wherein the section is taken along the plane 7-7 in FIG. 5.
Figure 8:
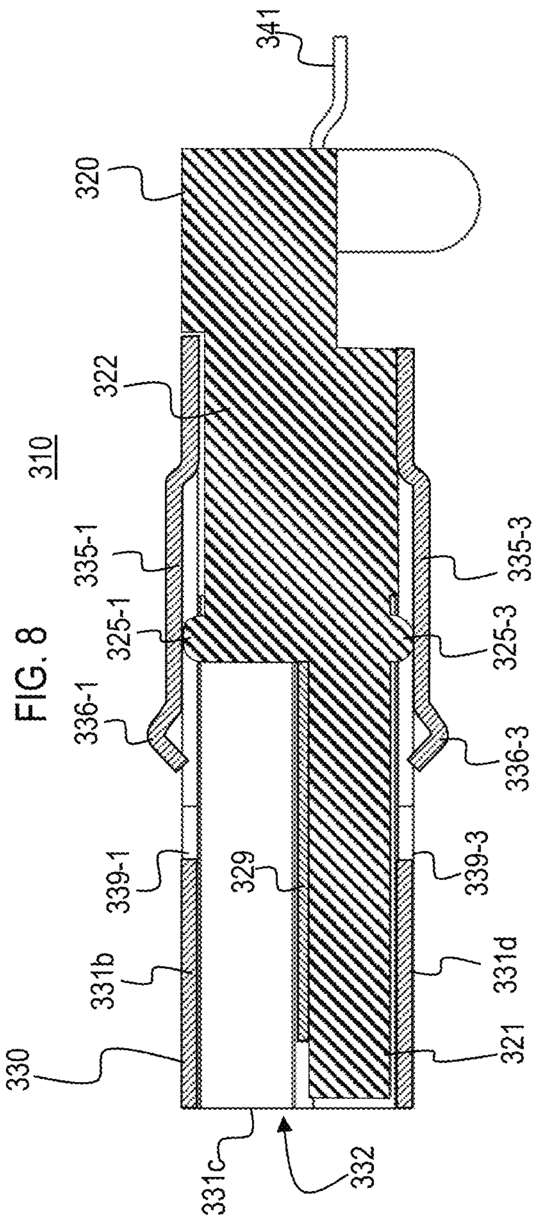
FIG. 8 is a cross sectional view of the example USB plug of FIG. 6 with the outer sleeve in the first position, wherein the section is taken along the plane 8-8 in FIG. 6.
Figure 9:
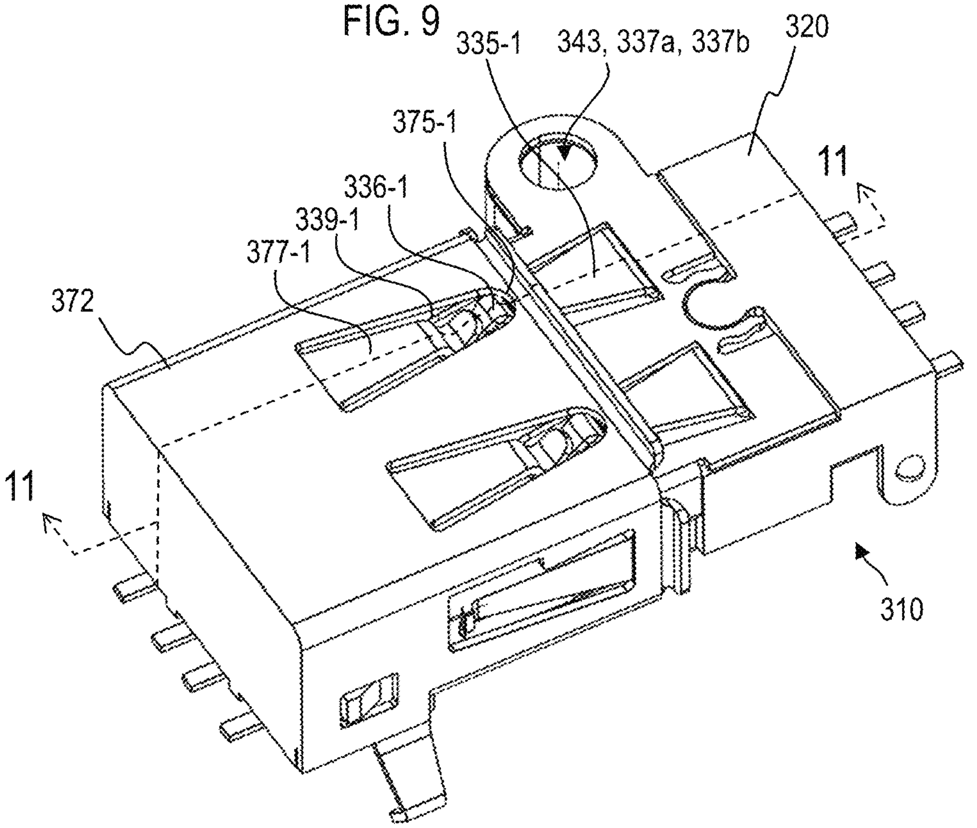
FIG. 9 is a top perspective view of the example USB plug and USB port of FIG. 3 with the USB plug inserted into the USB port and the outer sleeve in the second position.
Figure 10:
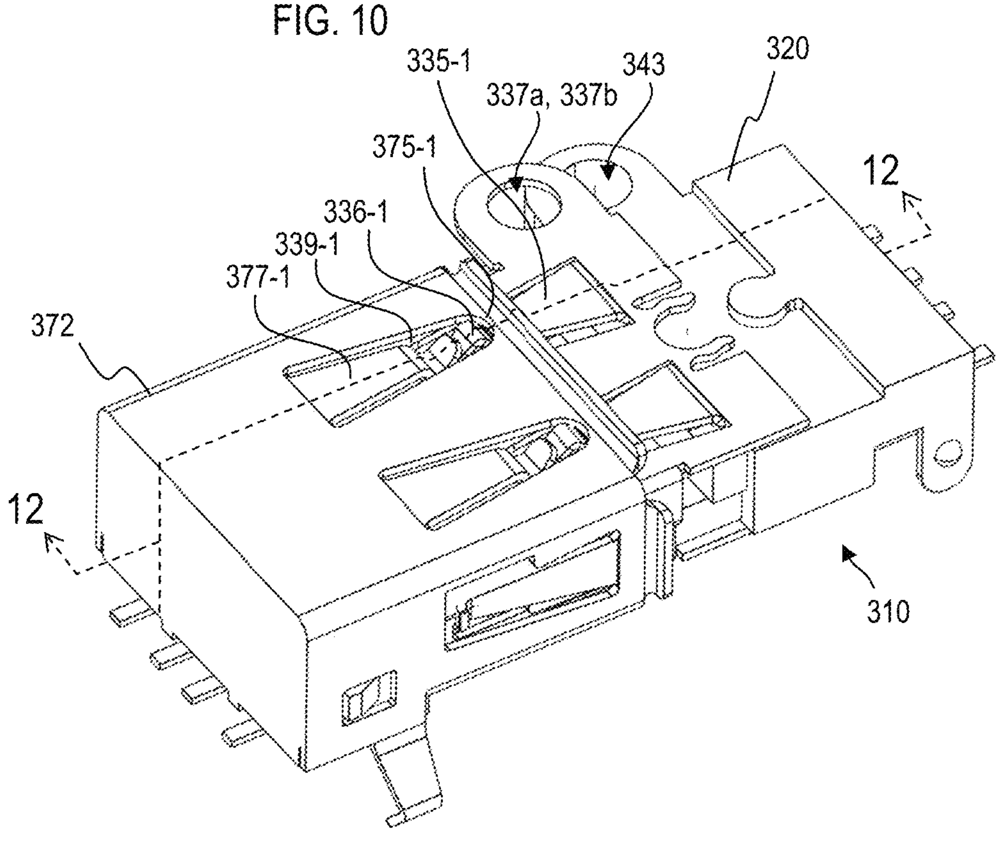
FIG. 10 is a top perspective view of the example USB plug and USB port of FIG. 3 with the USB plug inserted into the USB port and the outer sleeve in the first position.

As depicted in FIGS. 3 and 4, the second body portion 322 of the example implementation includes a plurality of protrusions 325. Each of the plurality of protrusions 325 are respectively positioned in relation to one of the plurality of spring latch members 335 of the outer sleeve 330, as shown in FIGS. 5-8. As will be discussed in greater detail below, the plurality of protrusions 325 and the plurality of spring latch members 335 move relative to one another as the outer sleeve 330 moves relative to the inner body 320 from the first position to the second position and visa-versa. The first position is illustrated in FIGS. 6 and 8 and the second position as illustrated in FIGS. 5 and 7. In the first position, the plurality of protrusions 325 prevent the plurality of spring latch members 335 from elastically bending thereby preventing the plurality of spring latch members 335 from disengaging from the latch engagement members 375 of the USB port 371, when in an installed state. In the second position, the plurality of protrusions 325 do not prevent the plurality of spring latch members 335 from elastically bending thereby allowing the plurality of spring latch members 335 to disengage from the latch engagement members 375 of the USB port 371. If the plurality of spring latch members 335 are disengaged from the latch engagement members 375, the USB plug 310 may be removed from the USB port 371. Additional details associated with the first and second positions will be described below. As illustrated in FIGS. 3 and 4, the plurality of protrusions include a first protrusion 325-1 and a second protrusion 325-2 that each extend from the second top surface 327*b* as well as a third protrusion 325-3 and a fourth protrusion 325-4 that each extend from the second bottom surface 327*d*.

The USB plug 310 includes a retention feature configured to releasably hold the outer sleeve 330 in the first position relative to the inner body 320 to assist in resisting accidental disengagement of the USB plug 310 from the USB port 371 due to shock, vibration, and gravity. As illustrated in FIGS. 3, 5, and 6, the retention feature comprises a snap-fit connection between the inner body 320 and the outer sleeve 330, with one portion disposed on the inner body 320 and another portion disposed on the outer sleeve 330. As illustrated in FIGS. 5 and 6, the snap-fit connection comprises a knob 328 extending from the second top surface 327*b* of the inner body 320 and a snap retention member 338 disposed on the outer sleeve 330. As will be described in greater detail below, the snap retention member 338 is elastically bendable and complementary to the knob 328 so as to releasably secure the same when the outer sleeve 330 is in the second position.

The second body portion 322 includes attachment mechanisms 340 and rear electrical terminations 341 as illustrated in FIGS. 3 and 4. The attachment mechanisms 340 couple the USB plug 310 to an auxiliary device (not shown) for use with an information processing device. The rear electrical terminations 341 serve to electrically connect the first electrical contacts 329 with the electronic circuitry (not shown) of the removable electronic module. Although not required, i.e., optionally, the second body portion 322 includes a lock portion 342 as depicted in FIGS. 3-6. The lock portion 342 is disposed between a top lock portion 334*a* of the outer sleeve 330 and a bottom lock portion 334*a* of the outer sleeve 330 when the outer sleeve 330 is moved to the first position. The top lock portion 334*a* defines a top bore 337*a*, the bottom lock portion 334*a* defines a bottom bore 337*b*, and the lock portion 342 defines a lock bore 343. When the outer sleeve 330 is in the first position, the top bore 337*a*, the bottom bore 337*b*, and the lock bore 343 align coaxially and are configured to receive a portion of a lock (not shown) to prevent the outer sleeve 330 from moving relative to the inner body 320. The lock may provide redundancy with respect to the retention feature previously described. Additionally, the lock may provide additional security to prevent theft of the removable electronic module.

As illustrated in FIGS. 3-6, the outer sleeve 330 includes a top sleeve wall 331*b*, a bottom sleeve wall 331*d* spaced from and opposite the top sleeve wall 331*b*, a left sleeve wall 331*a* extending between the top sleeve wall 331*b* and the bottom sleeve wall 331*d*, and a right sleeve wall (not shown) extending between the top sleeve wall 331*b* and the bottom sleeve wall 331*d* opposite and spaced from the left sleeve wall 331*a*. The top sleeve wall 331*b*, the bottom sleeve wall 331*d*, the left sleeve wall 331*a*, and the right sleeve wall (not shown) together define an interior space 332 to receive a portion of the inner body 320.

The outer sleeve 330 comprises a plurality of spring latch members 335 configured to engage with and disengage from latch engagement members 375 of a USB port when in the installed state. By engaging the plurality of spring latch members 335 with the latch engagement members 375, the USB plug 310 becomes releasably engaged with the USB port. As depicted in FIG. 3, the top sleeve wall 331*b* includes a first spring latch member 335-1 and a second spring latch member 335-2. As depicted in FIG. 4, the bottom sleeve wall 331*d* includes a third spring latch member 335-3 and a fourth spring latch member 335-4. With respect to the example USB port 371, the first spring latch member 335-1, the second spring latch member 335-2, the third spring latch member 335-3, and a fourth spring latch member 335-4 would respectively engage the latch engagement members 375-1, 375-2, 375-3, 375-4.

As illustrated in FIGS. 3-12, the sleeve further comprises a first latch lip 339-1 that defines a portion of a first spring aperture in the top sleeve wall 331*b*. The first latch lip 339-1 is configured to engage the spring latch member 377-1 of the USB port in the installed state. Similarly, the spring latch lips 339-2, 339-3, and 339-4 engage the spring latch members 377-2, 377-3, and 377-4, respectively, in the installed states.

Figure 11:
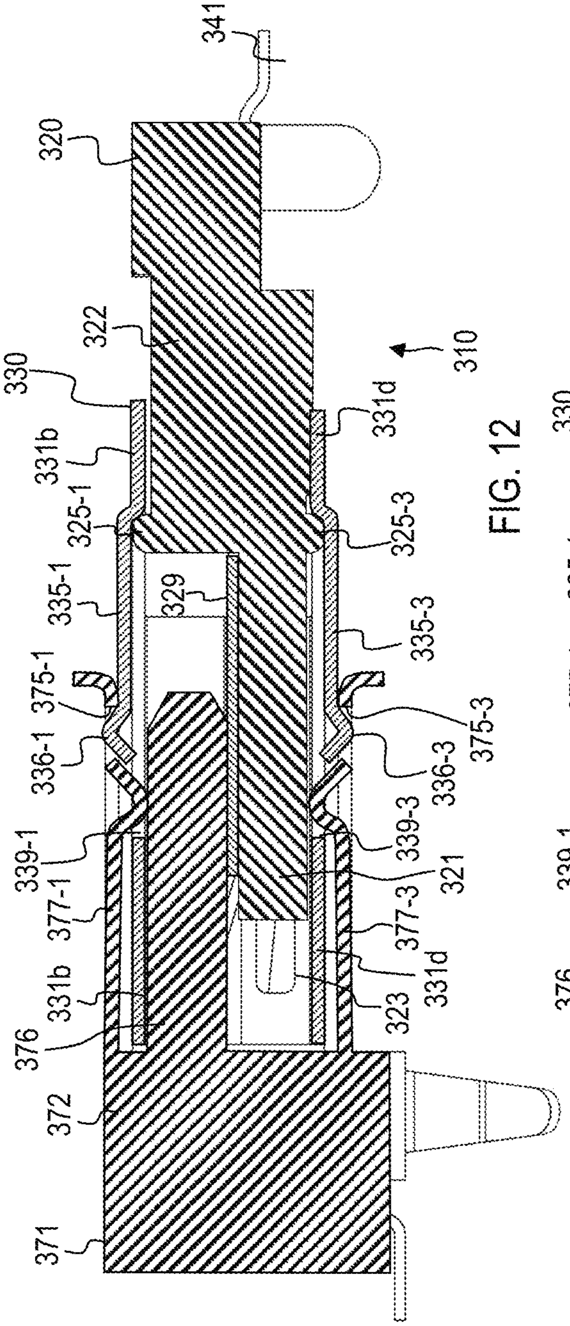
FIG. 11 is a cross sectional view of the example USB plug and USB port of FIG. 9 with the USB plug inserted into the USB port and the outer sleeve in the second position, wherein the section is taken along the plane 11-11 in FIG. 9.

The first spring latch member 335-1 extends from the top sleeve wall 331*b* into a portion of the first spring aperture towards but spaced from the first latch lip 339-1. The first spring latch member 335-1 includes a first spring engagement element 336-1 disposed at a distal end of the first spring latch member 335-1 which is closest to the first latch lip 339-1. The first spring aperture is configured to receive a portion of a respective spring latch member 377-1 of the example USB port 371 and the first latch lip 339-1 is configured to engage a portion of the spring latch member 377-1. During installation, the first spring engagement element 336-1 contacts the inner surface of the receptacle 372 and the first spring latch member 335-1 elastically bends toward the opposite sleeve wall. Installation is complete once a portion of the first engagement element 336-1 rests adjacent to, or engages, the latch engagement member 375-1 as illustrated in FIG. 11. The second, third, and fourth spring latch members 335-2, 335-3, 335-4 each comprise similar components as those described above with respect to the first spring latch member 335-1. Similar components are referred to using the same number followed by a different hyphenated number, such as 335-1 and 335-2. The descriptions of components of the first spring latch member 335-1 are applicable to the similar components of the second, third, and fourth spring latch members 335-2, 335-3, 335-4, and thus duplicative description of various aspects already described above may be omitted below.

Still with respect to the outer sleeve 330, the left sleeve wall 331*a* defines a first guide channel 333 that receives the first guiding feature of the first body portion 321 of the inner body 320 as depicted in FIGS. 5 and 6. The right sleeve wall (not shown) defines a second guide channel (not shown) the receives the second guiding feature (not shown) of the first body portion 321. The first guide channel 333 and the second guide channel constrain relative movement between the outer sleeve 330 and the inner body 320 to a single axis of movement between the first position and the second position. As previously described, FIGS. 5, 7, and 11 depict the outer sleeve 330 in the second position relative to the inner body 320 and FIGS. 6, 8, and 12 depict the outer sleeve 330 in the first position relative to the inner body 320.

The top sleeve wall 331*b* comprises the other portion of the retention feature configured to releasably secure the outer sleeve 330 to the inner body 320 in the first position. As illustrated in FIGS. 5 and 6, the retention feature comprises the snap-fit connection including elements on each of the inner body 320 and the outer sleeve 330. The top sleeve wall 331*b* includes the snap retention member 338 which defines a space complementary to the knob 328 to releasably secure the same via spring force and friction. The snap retention member 338 is configured to elastically bend around the knob 328 to receive and releasably secure the same.

Figure 12:
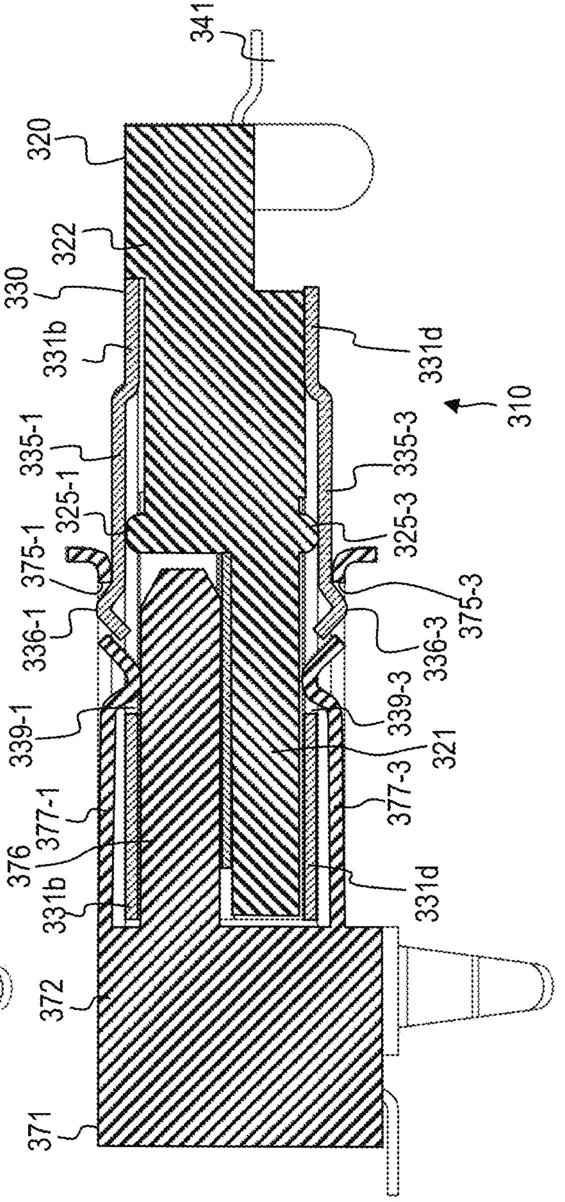
FIG. 12 is a cross sectional view of the example USB plug and USB port of FIG. 10 with the USB plug inserted into the USB port and the outer sleeve in the first position, wherein the section is taken along the plane 12-12 in FIG. 9.

As illustrated in FIGS. 5-12, the outer sleeve 330 is movably coupled to the inner body 320 and movable between the first position (depicted in FIGS. 6, 8, 10 and 12) and the second position (depicted in FIGS. 5, 7, 9 and 11). When the outer sleeve 330 transitions between the first position and the second position, the position of the plurality of protrusions 325 of the inner body 320 changes relative to the plurality of respective spring latch members 335. As shown in FIGS. 8 and 12, when the outer sleeve 330 is in the first position, the first protrusion 325-1 is located between the proximal and distal end of the first spring latch member 335-1 and prevents the first spring latch member 335-1 from elastically bending toward the opposite sleeve wall from which it is disposed. Because the first spring latch member 335-1 is prevented from elastically bending, the first spring latch member 335-1 cannot disengage from the first latch engagement member 377-1 of the example USB port 371 as depicted in FIG. 12. As shown in FIGS. 7 and 11, when the outer sleeve 330 is in the second position, the first protrusion 325-1 is located adjacent a proximal end of the first spring latch member 335-1 allowing the first spring latch member 335-1 to elastically bend toward the opposite sleeve wall from which it is disposed, thus enabling disengagement and removal of the USB plug 310 if so desired.

Notably, the second, third, and fourth protrusions 325-2, 325-3, 325-4 are similarly positioned relative to the second, third, and fourth spring latch members 335-2, 335-3, 335-4 with respect to the first protrusion 325-1 relative to the first spring latch member 335-1. Additionally, the second, third, and fourth protrusions 325-2, 325-3, 325-4 respectively prevent elastic bending of the second, third, and fourth spring latch spring latch members 335-2, 335-3, 335-4 depending on the position of the outer sleeve 330 relative to the inner body 320 similar to the first protrusion 325-1 and the first spring latch member 335-1 as described above. Accordingly, duplicative description of various aspects already described above may be omitted below with respect to the second, third, and fourth protrusions 325-2, 325-3, 325-4 as well as the second, third, and fourth spring latch members 335-2, 335-3, 335-4.

Figure 13:
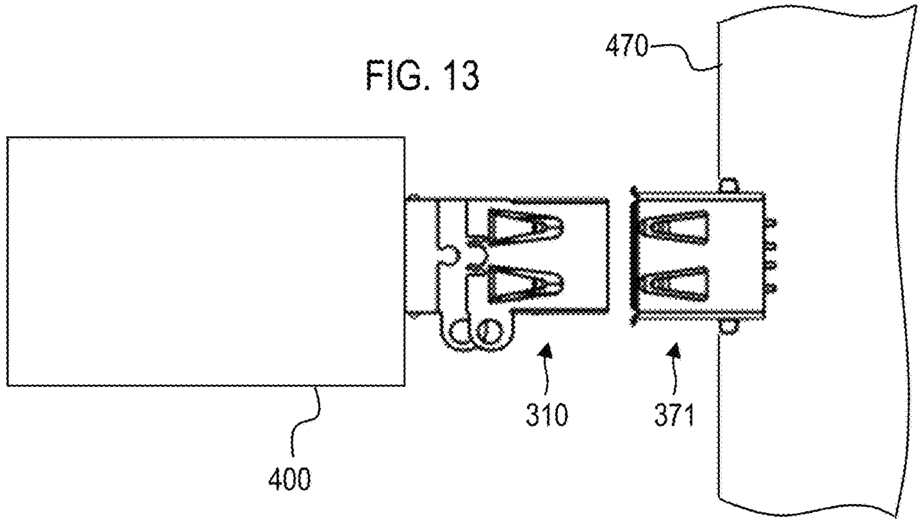
FIG. 13 is a top view of an example implementation of an auxiliary device including the removable electronic module prior to engagement with a USB port of an information processing device.
Figure 14:
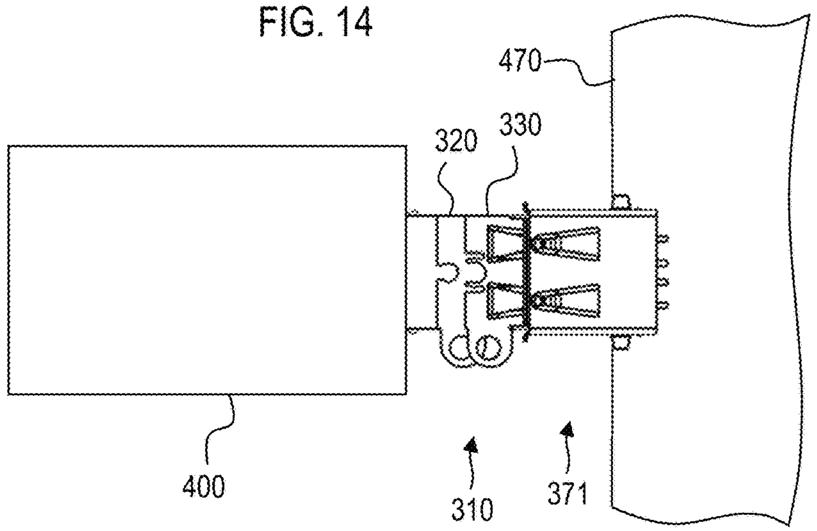
FIG. 14 is a top view of the example implementation of the auxiliary device including the removable electronic module of FIG. 13 inserted into the USB port of the information processing device, wherein an outer sleeve is in a second position.
Figure 15:
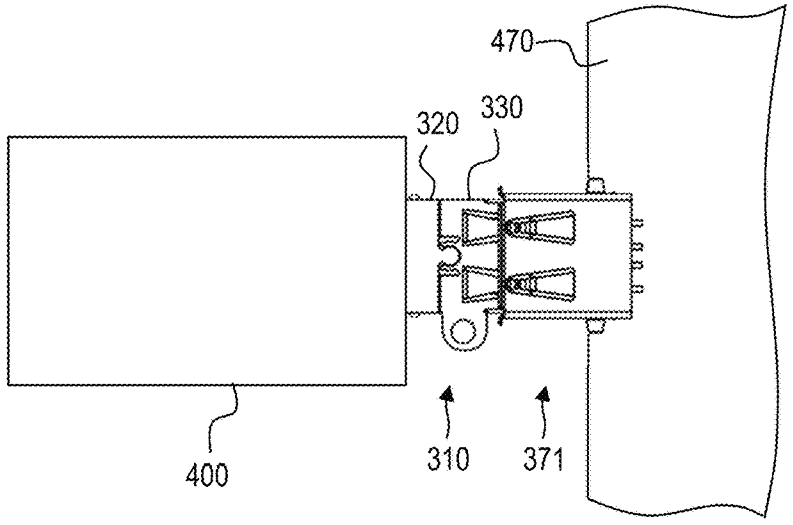
FIG. 15 is a top view of the example implementation of the auxiliary device including the removable electronic module of FIG. 14 inserted and secured with the USB port of the information processing device, wherein the outer sleeve is in a first position.

Turning now to FIGS. 13-15, an example implementation of a method for installing and securing a removable electronic module 400 into an information processing device 470 including a USB port 371 having one or more latch engagement members will now be described. When viewed in sequential order, FIGS. 13-15 broadly illustrate installation of and securing a USB plug 310 of a removable electronic module 400 into a USB port 371 of an information processing device 470. When viewed in reverse sequential order, FIGS. 13-15 illustrate disengagement and removal of the USB plug 310 of the removable electronic module 400 from the USB port 371 of the information processing device 470. FIGS. 9-12 illustrate aspects of the same in in greater detail.

The method includes providing a removable electronic module 400. The removable electronic module 400 may comprise electronic circuitry and a USB plug 310, the USB plug including an inner body 320 and an outer sleeve movably coupled to and at least partially surrounding the inner body 320, the inner body 320 having electrical contacts and one or more protrusions. The outer sleeve 330 includes one or more spring latch members configured to engage the latch engagement members of the USB port 371 when in an installed state. The outer sleeve 330 is movable relative to the inner body 320 between a first position and a second position. In the first position, the one or more protrusions prevent the one or more spring latch members from elastically bending. In the second position, the one or more protrusions do not prevent the one or more spring latch members from elastically bending.

In some example implementations, the outer sleeve 330 is initially moved to the second position. When the outer sleeve 330 is in the second position, the one or more spring latch members are allowed to elastically bend relative to the outer sleeve 330. The USB plug 310 is then inserted into the USB port 371 until the one or more spring latch members engage the latch engagement members of the USB port 371. Once the one or more spring latch members are engaged with the latch engagement members, the USB plug 310 enters an installed state with the USB port 371. In the installed state, the USB plug 310 is releasably engaged with the USB port 371.

The outer sleeve 330 is then slid from the second position to the first position relative to the inner body 320, while the USB plug 310 is releasably engaged with the USB port 371, to enter a retained state. When the outer sleeve 330 is slid into the second position, the one or more protrusions change position relative to the one or more spring latch members such that the one or more protrusions prevent the one or more spring latch members from elastically bending relative to the outer sleeve 330. Because the one or more spring latch members cannot elastically bend, they cannot be disengaged from the latch engagement members. When in the retained state, the USB plug 310 is securely retained in the USB port 371 and disengagement from the same is prevented even with the application force, whether intentionally or unintentionally.

In some example implementations, the USB plug comprises a retention feature with one portion of the retention feature disposed on the inner body 320 and another portion of the retention feature disposed on the outer sleeve 330. When the outer sleeve 330 is slid to the second position, the different portions of the retention feature mate and assist in preventing unintentional disengagement of the USB plug 310 from the USB port 371.

To exit the retained stated, the outer sleeve 330 is slid from the first position to the second position relative to the inner body 320. In the second position, the one or more protrusions change position relative to the one or more spring latch members and do not prevent elastic bending of the same. With the one or more spring latch members capable of elastically bending relative to the outer sleeve 330, the USB plug 310 return to the installed state. Then, if so desired, the one or more spring latch members can disengage from the latch engagement members and the USB plug 310 can be removed from the USB port 371.

In some example implementations, the method comprises providing a lock separate from the USB plug 310. Next, the outer sleeve 330 is slid to the first position and the lock is passed through aligned portions of the outer sleeve 330 and the inner body 320 to prevent relative movement between the same. Locking the USB plug 310 in such a manner will prevent disengagement and removal of the USB plug 310 from the USB port 371, when in a retained stated. If the USB plug 310 is locked in such a manner while in an uninstalled stated, the USB plug 310 will be prevented from installation with the USB port 371. In order for the outer sleeve 330 to be moved to the first position, the lock must be removed from the USB plug 310. Once the lock is removed from the USB plug 310, the USB plug 310 may be removed from or installed into the USB port 371 depending on the state of the USB plug 310, i.e., installed or uninstalled.

The self-securing nature of the removable electronic module enables compatibility with any information processing device having a compatible USB port. As such, whether modern or legacy, the removable electronic module can provide an inexpensive solution to attaching auxiliary devices to information processing devices. Given the broad spectrum of compatible information processing devices, the removable electronic module eliminates the need to modify information processing devices in order to attach auxiliary devices such as wireless transmitters, wireless receivers, wireless transceivers, hardware accelerators, diagnostic devices, and testing devices. Moreover, when in a retained state, the removable electronic module prevents accidental or unintentional disengagement from information processing devices even with the application of an outside force, vibration, or the force of gravity.

In the description above, various types of electronic circuitry or devices are described. As used herein, "electronic" is intended to be understood broadly to include all types of circuitry/devices utilizing electricity, including digital and analog circuitry, direct current (DC) and alternating current (AC) circuitry, and circuitry/devices for converting electricity into another form of energy and circuitry/devices for using electricity to perform other functions. In other words, as used herein there is no distinction between "electronic" circuitry/devices and "electrical" circuitry/devices. In some cases, certain electronic circuitry/devices may comprise processing circuitry. Processing circuitry comprises circuitry configured with logic for performing various operations. The logic of the processing circuitry may comprise dedicated hardware to perform various operations, software (machine readable and/or processor executable instructions) to perform various operations, or any combination thereof. In implementations in which the logic comprises software, the processing circuitry may include a processor to execute the software instructions and a memory device that stores the software. The processor may comprise one or more processing devices capable of executing machine readable instructions, such as, for example, a processor, a processor core, a central processing unit (CPU), a controller, a microcontroller, a system-on-chip (SoC), a digital signal processor (DSP), a graphics processing unit (GPU), etc. In cases in which the processing circuitry includes dedicated hardware, in addition to or in lieu of the processor, the dedicated hardware may include any information processing device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. The processing circuitry may also include any combination of dedicated hardware and processor plus software.

It is to be understood that both the general description and the detailed description provide example implementations that are explanatory in nature and are intended to provide an understanding of the present disclosure without limiting the scope of the present disclosure. Other examples in accordance with the present disclosure will be apparent to those skilled in the art based on consideration of the disclosure herein. For example, various mechanical, compositional, structural, electronic, and operational changes may be made to the disclosed examples without departing from the scope of this disclosure, including for example the addition, removal, alteration, substitution, or rearrangement of elements of the disclosed examples, as would be apparent to one skilled in the art in consideration of the present disclosure. Moreover, it will be apparent to those skilled in the art that certain features or aspects of the present teachings may be utilized independently (even if they are disclosed together in some examples) or may be utilized together (even if disclosed in separate examples), whenever practical. In some instances, well-known circuits, structures, and techniques have not been shown or described in detail in order not to obscure the examples. Thus, the following claims are intended to be given their fullest breadth, including equivalents, under the applicable law, without being limited to the examples disclosed herein.

References herein to examples, implementations, or other similar references should be understood as referring to prophetic or hypothetical examples, rather than to devices/systems that have been actually produced, unless explicitly indicated otherwise. Similarly, references to qualities or characteristics of examples should be understood as representing the educated estimates or expectations of the inventors based on their understanding of the relevant principles involved, application of theory and/or modeling, and/or past experiences, rather than as being representations of the actual qualities or characteristics of an actually produced device/system or the empirical results of tests actually carried out, unless explicitly indicated otherwise.

Further, spatial, positional, and relational terminology used herein is chosen to aid the reader in understanding examples of the invention but is not intended to limit the invention to a particular reference frame, orientation, or positional relationship. For example, spatial, positional, and relational terms such as "up", "down", "lateral", "beneath", "below", "lower", "above", "upper", "proximal", "distal", and the like may be used herein to describe directions or to describe one element's or feature's spatial relationship to another element or feature as illustrated in the figures. These spatial terms are used relative to reference frames in the figures and are not limited to a particular reference frame in the real world. Furthermore, if a different reference frame is considered than the one illustrated in the figures, then the spatial terms used herein may need to be interpreted differently in that different reference frame. Moreover, the poses of items illustrated in the figure are chosen for convenience of illustration and description, but in an implementation in practice the items may be posed differently.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition. Moreover, unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within +1% of the stated value, property, or relationship unless indicated otherwise.

What is claimed is:

1. A removable electronic module, comprising:
electronic circuitry; and
a universal serial bus (USB) plug, comprising:
an inner body comprising:
electrical contacts electrically connected to the electronic circuitry and configured to removably engage with complimentary electrical contacts in a USB port in an installed state of the USB plug in the USB port; and
one or more protrusions;
an outer sleeve movably coupled to and at least partially surrounding the inner body, the outer sleeve comprising one or more spring latch members configured to engage with latch engagement members of the USB port in the installed state of the USB plug in the USB port to releasably secure the USB plug in the USB port;
wherein the spring latch members are configured to engage with and disengage from the latch engagement members by elastically bending;
wherein the outer sleeve is movable relative to the inner body between a first position and a second position;
wherein the protrusions are configured to, when the outer sleeve is in the first position, prevent removal of the USB plug from the USB port by preventing the spring latch members from elastically bending to disengage from the latch engagement members,
wherein the protrusions are configured to, when the outer sleeve is in the second position, allow removal of the USB plug from the USB port by allowing the spring latch members to elastically bend to disengage from the latch engagement members.

2. The removable electronic module of claim 1, the inner body comprising,
a first body portion comprising:
a first top surface;
a first bottom surface spaced from and opposite the first top surface,
a first left surface extending from the first top surface to the first bottom surface; and
a first right surface spaced from and opposite the first left surface, the first right surface extending form the first top surface to the first bottom surface; and
a second body portion comprising:
a second top surface;
a second bottom surface spaced from and opposite the second top surface,
a second left surface extending from the second top surface to the second bottom surface; and
a second right surface spaced from and opposite the second left surface, the second right surface extending form the second top surface to the second bottom surface;

the one or more protrusions comprising:

a first protrusion extending outward from one of the second top surface and the second bottom surface; and a second protrusion extending outward from one of the second top surface and the second bottom surface.

3. The removable electronic module of claim 2, wherein the first and second protrusions both extend outwardly from one of either the second top surface or the second bottom surface of the inner body and the first and second spring latch members are both disposed on one of either the top sleeve wall or the bottom sleeve wall relative to the locations of the first and second protrusions on the inner body.

4. The removable electronic module of claim 2, wherein the first protrusion extends outwardly from the second top surface and the second protrusion extends outwardly from the second bottom surface, wherein the first spring latch member is disposed on the top sleeve wall and the second spring latch member is disposed on the bottom sleeve wall.

5. The removable electronic module of claim 4, the inner body comprising, a third protrusion extending from the body bottom side; and a fourth protrusion extending from the body bottom side; and the outer sleeve comprising, a third spring latch member disposed on the sleeve bottom side; and a fourth spring latch member disposed on the sleeve bottom side;

wherein each of the first and second protrusions extend outwardly from the second top surface and each of the first and second spring latch members are disposed on the sleeve top side.

6. The removable electronic module of claim 2, the one or more protrusions comprises:

a third protrusion extending outward from the second bottom surface; and a fourth protrusion extending outward from the second bottom surface;

wherein the first protrusion and the second protrusion each extend outward from the second top surface.

7. The removable electronic module of claim 2, the outer sleeve comprising:

a top sleeve wall;

a bottom sleeve wall spaced from and opposite the top sleeve wall;

a left sleeve wall;

a right sleeve wall spaced from and opposite the left sleeve side;

a first spring latch member disposed on one of the top sleeve wall and the bottom sleeve wall, the first spring latch member comprising:

a first latch lip defining a portion of a first spring aperture in one of the top sleeve wall and the bottom sleeve wall; and a first spring latch extending from one of the top sleeve wall and the bottom sleeve wall into a portion of the first spring aperture towards but spaced from the first latch lip, the first spring latch comprising:

a first spring engagement element disposed at a distal end of the first spring latch which is closest to the first latch lip; and a second spring latch member disposed on one of the top sleeve wall and the bottom sleeve wall, the second sprint latch member comprising:

a second latch lip defining a portion of a second spring aperture in one of the top sleeve wall and the bottom sleeve wall; and a second spring latch extending from one of the top sleeve wall and the bottom sleeve wall into a portion of the second spring aperture towards but spaced from the second latch lip, the first spring latch comprising:

a second spring engagement element disposed at a distal end of the second spring latch which is closest to the second latch lip;

wherein the first and second spring latch members are configured to interact with the first and second protrusions, the first and second spring latch members are disposed on the top sleeve wall or the bottom sleeve wall relative to the locations of the first and second protrusions on the inner body, respectively.

8. The removable electronic module of claim 1, the USB plug comprising one or more retention features, each of the one or more retention features comprising, a first retention feature disposed on the inner body; and a second retention feature disposed on the outer sleeve, the second retention feature complementary to the first retention feature, wherein the first retention feature and the second retention feature are configured to mate and releasably secure the inner body with the outer sleeve when in the first position.

9. The removable electronic module of claim 1, the USB plug comprising one or more guiding features, each of the one or more guiding features comprising, a tab extending from one of the inner body and the outer sleeve; and a guiding channel disposed on the other of the inner body and the outer sleeve, the retention channel configured to receive and constrain the tab;

wherein the one or more guiding features are configured to guide movement between the inner body and the outer sleeve with respect to the first position and the second position.

10. The removable electronic module of claim 1, the inner body comprising a lock portion defining a bore; and the outer sleeve comprising:

a top lock portion defining a top bore; and a bottom lock portion spaced from and opposite the top lock portion, the bottom lock portion defining a bottom bore;

wherein, when the outer sleeve is in the first position, the lock portion, the top lock portion, and the bottom lock portion align to position the lock portion between the top lock portion and the bottom lock portion; and wherein, when the outer sleeve is in the first position, the bore, the top bore, and the bottom bore align coaxially and are configured to receive a removable lock.

11. The removable electronic module of claim 1, wherein the removable electronic module comprises one or more devices selected from the group of a wireless transmitter, a wireless receiver, a wireless transceiver, a hardware accelerator, a diagnostic instrument, and a testing instrument.

12. A system comprising, the removable electronic module of claim 4; and an information processing device including a USB port configured to be complementary to and receive the USB plug of the removable electronic module;

wherein the USB plug is configured to self-secure to the USB port and prevent disengagement or removal of the USB plug from the USB port.

13. The system of claim 12, the USB port comprising:

a top port wall;

a bottom port wall, the bottom port side spaced from and opposite the top port side;

a left port wall;

a right port wall spaced from and opposite the left port wall;

a first latch engagement member disposed on one of the top port wall and the bottom port wall, the first latch engagement member comprising:

a first latch lip defining a portion of a first latch aperture in one of the top sleeve wall and the bottom sleeve wall; and a first engagement latch extending from one of the top sleeve wall and the bottom sleeve wall into a portion of the first latch aperture towards but spaced from the first latch lip, the first engagement latch comprising:

a first latch engagement element disposed at a distal end of the first engagement latch which is closest to the first latch lip; and a second latch engagement member disposed on one of the top port wall and the bottom port wall, the second latch engagement member comprising:

a second latch lip defining a portion of a second latch aperture in one of the top sleeve wall and the bottom sleeve wall; and a second engagement latch extending from one of the top sleeve wall and the bottom sleeve wall into a portion of the second latch aperture towards but spaced from the second latch lip, the second engagement latch comprising:

a second latch engagement element disposed at a distal end of the second engagement latch which is closest to the second latch lip; and wherein the first and second latch engagement members are configured to releasably engage the first and second spring latch members, respectively.

14. The system of claim 13, wherein, when in an installed state, the first spring aperture receives a portion of the first latch engagement element and the first latch lip engages the same or another portion of the first latch engagement element;

wherein the first latch aperture receives a portion of the first spring engagement element and the first latch lip engages the same or another portion of the first spring engagement element;

wherein the second spring aperture receives a portion of the second latch engagement element and the second latch lip engages the same or another portion of the second latch engagement element; and wherein the second latch aperture receives a portion of the second spring engagement element and the second latch lip engages the same or another portion of the second spring engagement element.

15. A method for installing and locking a removable electronic module from an electronic device including a universal serial bus (USB) port having latch engagement members, the method comprising:

providing a removable electronic module comprising electronic circuitry and a USB plug, the USB plug including an inner body and an outer sleeve movably coupled to and at least partially surrounding the inner body, the inner body having electrical contacts and one or more protrusions, the outer sleeve having one or more spring latch members configured to engage the latch engagement members of the USB port when the USB plug is in an installed state with respect to the USB plug, the outer sleeve being movable between a first position and a second position relative to the inner body;

inserting the USB plug, with the outer sleeve in the second position, into the USB port until the one or more spring latch members engage with the latch engagement members of the USB port; and sliding the outer sleeve from the second position to the first position relative to the inner body, while the USB plug is in the USB port, to enter a retained state;

wherein in the retained state, the USB plug is self-secured to the USB port and the USB plug is prevented from disengaging or removal from the USB port.

16. The method of claim 15, wherein in the retained state, the outer sleeve is in the first position and the USB plug is securely retained with the USB port by preventing the spring latch members from disengaging from the latch engagement members.

17. The method of claim 16, wherein the sliding of the outer sleeve to the first position comprises positioning the one or more protrusions of the inner body relative to the one or more spring latch members such that, in the retained state, the one or more protrusions prevent the one or more spring latch members from elastically bending relative to the outer sleeve to prevent disengagement of the one or more spring latch members from the latch engagement members of the USB port.

18. The method of claim 15, comprising, prior to the inserting, sliding the outer sleeve to the second position relative to the inner body to enable the one or more spring latch members to elastically bend relative to the outer sleeve.

19. The method of claim 15, comprising:

sliding, when the USB plug is in a retained state, the outer sleeve from the first position to the second position relative to the inner body to exit the retained state and allow the one or more spring latch members to elastically bend relative to the outer sleeve; and after sliding the outer sleeve from the first position to the second position, removing the USB plug from the USB port.

20. The method of claim 15, wherein the one or more spring latch members are configured to engage with and disengage from the latch engagement members by elastically bending;

wherein the protrusions are configured to, when the outer sleeve is in the first position, prevent removal of the USB plug from the USB port by preventing the spring latch members from elastically bending to disengage from the latch engagement members, wherein the protrusions are configured to, when the outer sleeve is in the second position, allow removal of the USB plug from the USB port by allowing the spring latch members to elastically bend to disengage from the latch engagement members.

* * * * *